(12) United States Patent
Beheshti-Zavareh et al.

(10) Patent No.: US 9,154,410 B2
(45) Date of Patent: Oct. 6, 2015

(54) RESILIENCY-AWARE HYBRID DESIGN OF CONTROLLER-SWITCH CONNECTIVITY IN A SPLIT-ARCHITECTURE SYSTEM

(75) Inventors: Neda Beheshti-Zavareh, San Jose, CA (US); Ying Zhang, San Jose, CA (US)

(73) Assignee: TELEFONAKTIEBOLAGET L M ERICSSON (PUBL), Stockholm (SE)

( * ) Notice: Subject to any disclaimer, the term of this patent is extended or adjusted under 35 U.S.C. 154(b) by 440 days.

(21) Appl. No.: 13/347,592

(22) Filed: Jan. 10, 2012

(65) Prior Publication Data

US 2013/0028142 A1      Jan. 31, 2013

Related U.S. Application Data

(60) Provisional application No. 61/513,140, filed on Jul. 29, 2011.

(51) Int. Cl.
*H04L 12/753* (2013.01)
*H04L 12/707* (2013.01)
*H04L 12/703* (2013.01)
*H04L 12/721* (2013.01)

(52) U.S. Cl.
CPC ................ *H04L 45/48* (2013.01); *H04L 45/22* (2013.01); *H04L 45/28* (2013.01); *H04L 45/12* (2013.01); *H04L 45/24* (2013.01)

(58) Field of Classification Search
CPC ......... H04L 45/64; H04L 45/48; H04L 45/24; H04L 41/0836; H04L 41/12
USPC ......... 370/247, 248, 250, 251, 252, 254, 255, 370/256
See application file for complete search history.

(56) References Cited

U.S. PATENT DOCUMENTS

| | | | |
|---|---|---|---|
| 7,746,796 B2 * | 6/2010 | Swallow et al. | 370/249 |
| 8,045,551 B2 * | 10/2011 | Madrahalli et al. | 370/389 |
| 2002/0067693 A1 | 6/2002 | Kodialam et al. | |
| 2008/0049621 A1 * | 2/2008 | McGuire et al. | 370/236.2 |
| 2008/0304428 A1 * | 12/2008 | Stilling et al. | 370/256 |
| 2009/0135717 A1 * | 5/2009 | Kamal et al. | 370/225 |
| 2010/0165886 A1 * | 7/2010 | Borrill | 370/256 |
| 2011/0069686 A1 * | 3/2011 | Raman | 370/338 |

(Continued)

FOREIGN PATENT DOCUMENTS

EP           2552065 A1    1/2013

OTHER PUBLICATIONS

Beheshti N. et al. "Fast Failover for Control Traffic in Software-defined Networks", Global Communications Conference, 2012 IEEE; Dec. 3, 2012; pp. 2665-2670.

(Continued)

*Primary Examiner* — Xavier S. Wong

(57) ABSTRACT

A method and apparatus for optimizing the resilience of a network using a combination of in-band and out-of-band signaling is disclosed. The metric used in the embodiment's algorithm to determine resilience is the maximum number of protected neighbors. Nodes closer to the controller are assigned a higher weight than those further from the controller because if their connection to the network is interrupted, all their downstream nodes will be affected and disconnected. Therefore, when determining a path to the controller, switches with alternate paths to the controller are preferred. Dedicated connections using out-of-band signaling are assigned to convert unprotected nodes to protected nodes thus improving the resilience of the network.

17 Claims, 5 Drawing Sheets

(56) References Cited

U.S. PATENT DOCUMENTS

2012/0250695 A1* 10/2012 Jia et al. ............ 370/400
2013/0182608 A1* 7/2013 Maggiari et al. ........ 370/254
2013/0259465 A1* 10/2013 Blair ................ 398/2

OTHER PUBLICATIONS

Zhang Y. et al., "On Resilience of Split-Architecture Networks", Global Telecommunications Conference 2011 IEEE, Dec. 5, 2011, pp. 1-6.
Silber J. et al.: "Augmenting overlay trees for failure resiliency", Global Telecommunications Conference, 2004, GLOBECOM 104, IEEE Dallas, TX, USA Nov. 29-Dec. 3, 2004, Piscataway, NJ USA, IEEE, Piscataway, NJ, USA, vol. 3, Nov. 29, 2004, pp. 1525-1531, XP010757778.
McKeown N. et al."Openflow: enabling innovation in campus networks," Mar. 2008, whole document.
OpenFlow Switch Specification, version 1.1.0 (Wire Protocl 0X02), http://openflow.org/documents/openflow1.1-allmerged-draft.pdf, Oct. 23, 2010, whole document.
Kin-Wah et al. "On the Feasibility and Efficacy of Protection Routing in IP Networks," University of Pennsylvania Technical Report, Jul. 2009, whole document.

* cited by examiner

RESILIENCY-AWARE HYBRID DESIGN OF CONTROLLER-SWITCH CONNECTIVITY IN A SPLIT-ARCHITECTURE SYSTEM

CROSS REFERENCE TO RELATED APPLICATIONS

The present application relates to U.S. Regular patent application Ser. No. 13/236,296 filed on Sep. 19, 2011 and U.S. Regular patent application Ser. No. 13/294,559 filed on Nov. 11, 2011 and claims priority from U.S. Provisional Patent Application No. 61/513,140, filed on Jul. 29, 2011.

FIELD OF THE INVENTION

The embodiments of the invention are related to the organization and design of networks. Specifically, the embodiments of the invention relate to a method and system for optimizing a network with in-band and out of band signaling of control traffic. The term "edges" and "links" are used interchangeably herein and refer to the network path interconnecting nodes.

BACKGROUND

In a conventional network architecture, there is a coupling of the forwarding and control planes in that both control and data packets are transmitted on the same link, hence the control traffic and data traffic is equally affected when a failure occurs. To simplify, control traffic is the traffic between a network element, referred to herein as a controller, that controls how flows of data are to be processed and forwarded and a forwarding element, referred to herein as a switch. Data traffic is the data payload that is sought to be transferred from one node to another node in a network. Throughout this application, forwarding element(s) are referred to as switch(es). However, the use of the term switch shall not be construed to limit such forwarding elements to Ethernet or layer 2 switches.

This coupling of the forwarding and control planes in a conventional network architecture usually results in an overly complicated control plane and complex network management. Disadvantageously, this is known to create a large burden and high barrier to new protocols and technology developments. For the most part, controllers and switches are tasked with minimizing the distance between nodes using a routing protocol such as Open Shortest Path First (OSPF). OSPF (IETF RFC 2328) is a link-state protocol in which a router broadcasts its neighbors' link-state information to all the nodes in the routing domain. Using this information every router constructs the topology map of the entire network in the domain. Each router maintains a link-state database which reflects the entire network topology. Based on this topology map and the link cost metrics, the routers determine the shortest paths to all other routers using Dijkstra's algorithm. This information is in turn used to create routing tables that are used for forwarding of IP packets.

The primary disadvantage of using a shortest-path routing protocol is that it does not consider network resilience or protection. In evaluating a network design, network resilience is an important factor, as a failure of a few milliseconds may easily result in terabyte data losses on high-speed links. As used herein resilience is the ability to provide and maintain an acceptable level of service in the face of faults and challenges to normal operation. A network element or forwarding element that has greater resilience is better protected from faults and challenges to normal operation than a network element or forwarding element that has lesser resilience. As used herein failure probability is the frequency with which an engineered system or component fails, expressed as the number of failures per hour, or the probability of each node fails in the long term.

Despite the rapid improvement in line speeds, port densities, and performance, the network control plane mechanisms have advanced at a much slower pace than the forwarding plane mechanisms. To overcome the cited disadvantages, the OpenFlow split architecture protocol has been developed.

A split-architecture network design introduces a separation between the control and forwarding components of a network. Among the use cases of such architecture are the access/aggregation domain of carrier-grade networks, enterprise networks, Internet service provider (ISP) networks, mobile backhaul networks, cloud computing, multilayer (L3, L2 and L1, OTN, WDM) support networks and data centers, all of which are among the main building blocks of a network architecture. Therefore, proper design, management and performance optimization of these networks are of great importance.

Unlike the conventional network architecture which integrates both the forwarding and the control planes in the same network element, a split architecture network executes the control plane on control elements (e.g., a controller) that might be in different physical locations from the forwarding elements (e.g., switches). The use of a split architecture enables the simplification of the switches implementing the forwarding plane and shifts the intelligence of the network into a number of controllers that oversee the switches. The control traffic (sent as, e.g., flow entries, packets, frames, segments, protocol data units) in a split-architecture network can be transmitted on different paths from the data traffic (sent as, e.g., packets, frames, segments, protocol data units) or even on a separate network. Therefore, the reliability of the control plane in these networks is no longer directly linked with that of the forwarding plane. However, disconnection between the control plane and the forwarding plane in a split architecture network could disable the forwarding plane. When a switch is disconnected from its controller, it cannot receive any instructions on how to forward new flows and becomes offline for all practical purposes.

In a split architecture network, the controller collects information from switches, and computes and distributes the appropriate forwarding decisions to the switches. Controllers and switches use a protocol to communicate and exchange information. An example of such protocol is OpenFlow (see www.openflow.org), which provides an open and standard method for communication between a switch and a controller, and it has drawn significant interest from both academia and industry.

FIG. 1 is a diagram 100 showing an overview of the OpenFlow interface between a switch 109 and a controller 101. Switch 109 is a component of network elements 105. Controller 101 communicates with switch 109 over secure channel 103 using the OpenFlow protocol. The flow or forwarding table 107 in an OpenFlow switch is populated with entries from controller 101, as seen in FIG. 2 consisting of: a rule 201 defining matches for fields in packet headers; an action 203 associated to the flow match 204; and a collection of statistics 205 on the flow 206.

When an incoming packet matches a particular rule, the associated actions are performed on the packet. As seen in FIG. 2, a rule 201 contains key fields 202 from several headers in the protocol stack, for example Ethernet MAC addresses, IP address, IP protocol, TCP/UDP port numbers as well as the incoming port number. To define a flow, all the available matching fields may be used. But it is also possible to restrict the matching rule to a subset of the available fields by using wildcards for the unwanted fields.

The de-coupled control platform of the split architecture eases the task of modifying the network control logic and provides a programmatic interface upon which developers can build a wide variety of new protocols and management applications. In this model, the data and control planes can evolve and scale independently, while the cost of the data plane elements is reduced.

It is well known that link and switch failures can adversely affect network performance. For example, a failure of a few milliseconds may easily result in terabyte data losses on high-speed edges. A link failure can occur over a link transporting control traffic, data traffic or both and it indicates that traffic traversing a link can no longer be transferred over the link. The failure can be either of a link between two switches or of a link between one controller and the switch to which it connects. In most cases, these links fail independently.

A switch failure indicates that a network element or forwarding element is unable to originate, respond, or forward any packet or other protocol data unit. Switch failures can be caused by software bugs, hardware failures, mis-configurations and similar issues. In most cases, these switches fail independently.

Special failure cases include connectivity loss between a switch and a controller: A switch can lose connectivity to its controller due to failures on the intermediate links or nodes along the path between the switch and the controller. Whenever a switch cannot communicate with its assigned controller, the switch will discard all the packets on the forwarding plane managed by the controller, even though the path on the forwarding plane is still valid. In other situations, a subset of the traffic can be forwarded by the forwarding plane or similar limited functionality can continue for a limited amount of time until a connection with an assigned controller or another controller is re-established. Therefore, this can be considered as a special case of switch failure.

Conventional split architecture design assumes the use of either fully in-band or fully out-of-band connectivity between forwarding and control planes. As used herein, in-band connections mean that data and control traffic share the same physical connections and out-of-band connections mean that data and control traffic share different physical connections. In conventional networks, where both control and data packets are transmitted on the same link, the control and data information are equally affected when a failure happens. When used in a split architecture, disconnection between the controller and the forwarding plane could disable the forwarding plane as the switch is unable to receive any instructions on how to forward new flows.

In conventional split-architecture network designs, each switch is pre-programmed with a path to reach the controller. Upon a link or node failure, the switch relies on the controller to detect such failure and re-compute the new path for the switch. Detection of any failures in switches or links by the controller must be based on some implicit mechanisms, such as when Hello messages are not received by the controller from a switch. This introduces significant delays in the network as it must detect the exact location of the failure and then re-establish the controller-switch connections. If no backup path can be configured for a switch, then the connection of the switch to the controller will be interrupted.

Studies of the resilience of networks have historically assumed an in-band control model, meaning that the control plane and data plane have the same resilience properties. The existing work on the connectivity between the control plane and forwarding plane in the split architecture assumes either fully in-band or fully out-of-band connections. In the fully in-band scenario, a single infrastructure is used for both data and control traffic. In the fully out-of-band scenario, the control traffic is carried over a separate network from the data network. While the latter scenario provides a more reliable connection to the switch for control traffic, it can be very costly to set up a completely separate network for the control traffic. Although split-architecture networks use an out-of-band model, link and switch failures are still a concern as a single controller is directly coupled by a link to each network element acting as a switch. In such a network, if the link between the controller and switch fails, the switch is unable to update its forwarding table and eventually fails.

When using a split architecture in the access/aggregation network environment, the advantages of sending control traffic out-of-band may not always hold. First, the network can be geographically distributed. Thus, a direct link between every switch to the controller may require long-distance fiber and costly deployment. Second, even in a single geographic location, when the size of the network grows to a large scale, building a separate out-of-band dedicated network for the control plane can be expensive. What is desired is a hybrid design for connection between the controller and the switches that is capable of incorporating both in-band and out-of-band models.

BRIEF DESCRIPTION OF THE DRAWINGS

The present invention is illustrated by way of example, and not by way of limitation, in the figures of the accompanying drawings in which like references indicate similar elements. It should be noted that different references to "an" or "one" embodiment in this disclosure are not necessarily to the same embodiment, and such references mean at least one. Further, when a particular feature, structure, or characteristic is described in connection with an embodiment, it is submitted that it is within the knowledge of one skilled in the art to affect such feature, structure, or characteristic in connection with other embodiments whether or not explicitly described.

DETAILED DESCRIPTION

Figure 1:
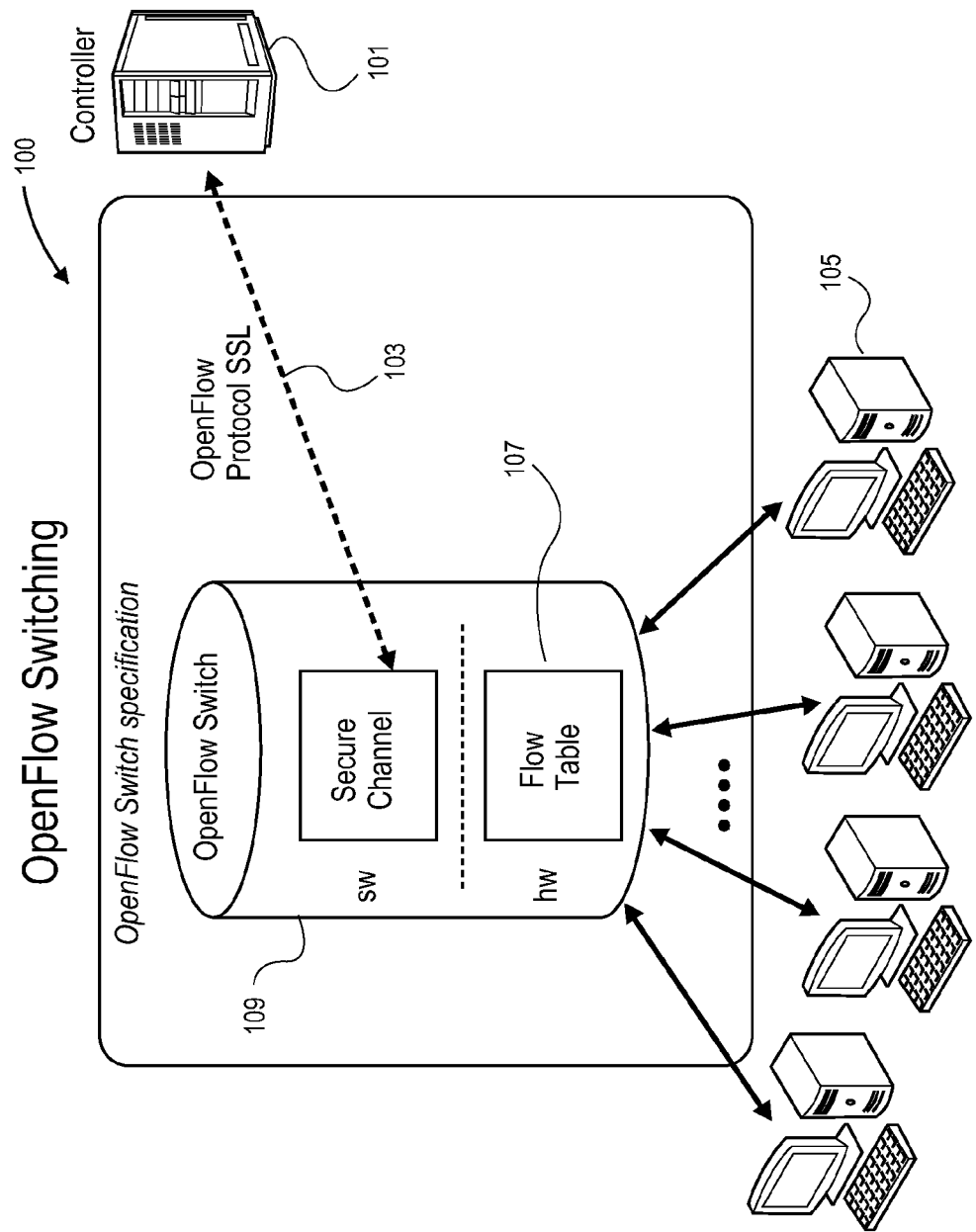
FIG. 1 is a diagram of a simple OpenFlow network.
Figure 2:
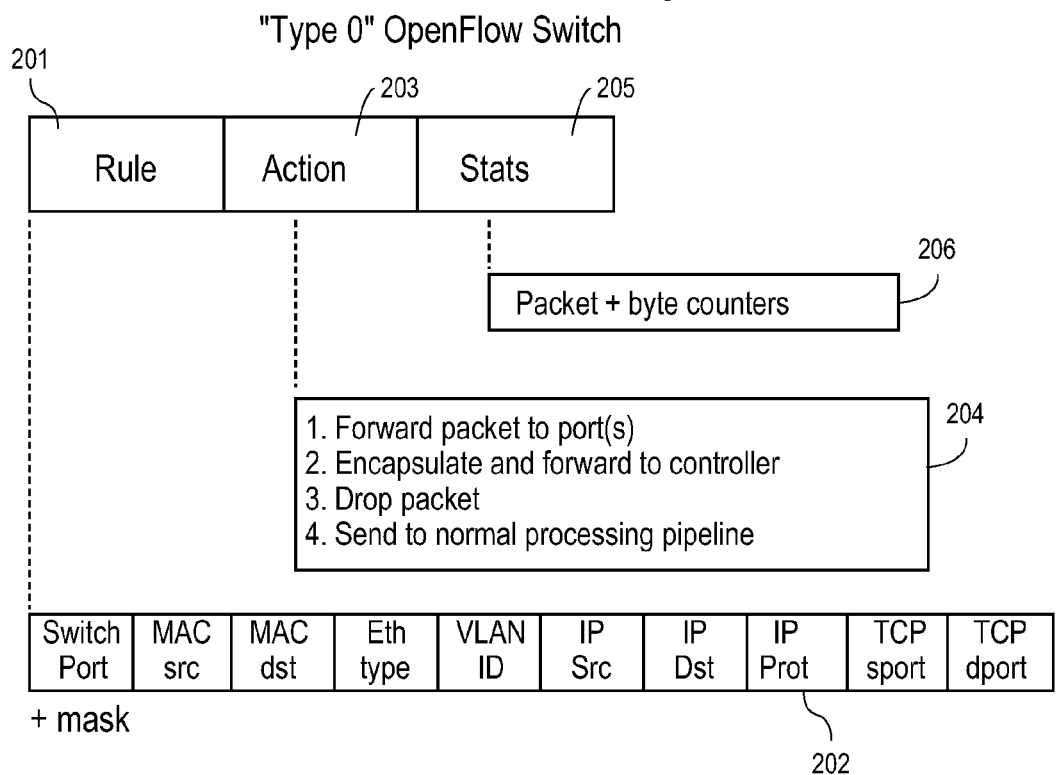
FIG. 2 is a diagram of the contents of a flow table entry.

In the following description, numerous specific details are set forth. However, it is understood that embodiments may be practiced without these specific details. In other instances, well-known circuits, structures and techniques have not been shown in detail in order not to obscure the understanding of this description. It will be appreciated, however, by one skilled in the art, that the invention may be practiced without such specific details. Those of ordinary skill in the art, with the included descriptions, will be able to implement appropriate functionality without undue experimentation.

The techniques shown in the figures and the claimed network topology design system can be implemented using code, instructions and data stored and executed on one or more electronic devices (e.g., an end station, a network element, server or similar electronic devices). Such electronic devices store and communicate (internally and/or with other electronic devices over a network) code and data using non-transitory machine-readable or computer-readable media, such as non-transitory machine-readable or computer-readable storage media (e.g., magnetic disks; optical disks; random access memory; read only memory; flash memory devices; and phase-change memory). In addition, such electronic devices typically include a set of one or more microprocessors coupled to one or more other components, such as one or more storage devices, user input/output devices (e.g., a keyboard, a touch screen, and/or a display), and network connections. The coupling of the set of microprocessors and other components is typically through one or more busses and bridges (also termed as bus controllers). The storage devices within the network topology design system represent one or more non-transitory machine-readable or computer-readable storage media and non-transitory machine-readable or computer-readable communication media. Thus, the non-transitory machine-readable or computer-readable storage media of a given electronic device or network topology design system typically stores code, instructions and/or data for execution on the set of one or more processors of that electronic device. Of course, one or more parts of an embodiment may be implemented using different combinations of software, firmware, and/or hardware.

As used herein, a network element or forwarding element (e.g., a router, switch, bridge, or similar networking device.) is a piece of networking equipment, including hardware and software that communicatively interconnects other equipment on the network (e.g., other network elements, end stations, or similar networking devices). Some network elements are "multiple services network elements" that provide support for multiple networking functions (e.g., routing, bridging, switching, Layer 2 aggregation, session border control, multicasting, and/or subscriber management), and/or provide support for multiple application services (e.g., data collection).

The embodiment comprises a method and apparatus for optimally choosing a number of out-of-band connections for the control traffic in the split architecture network. The output of the embodiment is a set of selected switches in the network to be connected to the controller through out-of-band connections that are dedicated connections used only for the control traffic. The embodiment establishes the number of allowed out-of-band connections in such a way that resiliency of the network is maximized.

The number of possible or practicable out-of-band connections is an input to the embodiment's algorithm and is determined by the network management system or the operator. The greater the number of out-of-band connections, the more reliable the connectivity between the controller and the switches.

With a given number of out-of-band connections, the embodiment determines the optimal set of switches that result in maximum resiliency. In other words, the embodiment makes the best use of these extra out-of-band connections between the forwarding and control planes in terms of resiliency.

The embodiment extends the Applicants' invention in co-pending U.S. Regular patent application Ser. No. 13/236,296 which places the controller of a split architecture area in a location selected to optimize the connection resilience between the controller and the switches in that area. As in such co-pending application, no assumptions on how the partitioning of the split-architecture areas are made. The partitioning, if any, can be based on any arbitrary metrics such as geographical constraints.

Applicants' co-pending U.S. Regular patent application Ser. No. 13/236,296, discloses a pre-configuration of a backup path in each switch, so that if the primary outgoing link to the immediate upstream node does not work properly, a secondary outgoing link can be used as a backup path. With such protection scheme, when a switch detects a failure in its outgoing link or its immediate upstream node, it immediately changes its route to the controller, and uses the backup path, i.e., outgoing interface, pre-programmed in the switch to reconnect to the controller. This takes place without a need to involve the controller and without any effect on the rest of the routes in the network and on the connections of the downstream nodes to the controller. In other words, there will only be a local change in the outgoing interface of the affected switch. All other connections in the network will remain intact. If no backup path exists, then the connection between the switch to the controller will be interrupted in case of a failure in the primary path to the controller.

In a split architecture system, a more resilient network will have a greater number of switches with backup paths, the most resilient network being one in which each and every switch has a pre-configured backup path to the controller. Hence, the resilient or protection metric can be described as follows:

Denote a network with the graph $G=(V, E)$, where V the set of nodes in the network, and E is the set of bidirectional links between nodes. A cost is associated with each link in the network. Based on assigned link costs, shortest-path routes are calculated between any two nodes in the network. It is assumed that the cost on each link applies to both directions of the link. With this given topology, assume that one of the nodes is the controller and the rest of the nodes are the switches. Also assume that there is no load balancing on the control traffic sent between the switches and the controller. Therefore, each node has only one path to reach the controller. In other words, the control traffic is sent to and from the controller over a tree, rooted at the controller node. This is referred to as the controller routing tree. This controller routing tree covers all the nodes in the network and is a subset of the links E. Further assume that the same routing tree will be used for communications between the controller and the switches in both directions.

With a given, fixed controller location within the network, different routing algorithms can be used to form different routing trees whereby each node sends control traffic to the controller. In the controller routing tree T, node u is an upstream node of node v if there is a path in T from node v to node u towards the controller. Node u is called a downstream node of node v if there is a path in T from node u to node v towards the controller. In the controller routing tree, a node's parent is its immediate upstream node and a node's children are its immediate downstream nodes, upstream and downstream being determined after an initial controller routing tree is generated.

With a given, fixed controller location and controller routing tree T, consider node a and its immediate upstream node b. Node a is protected against the failure of its outgoing link (a, b) if there exists node $c \in V \setminus \{a, b\}$, read as node c is an element of V but not including nodes a and b, that meet the following conditions:

Condition 1: Link (a, c) is in G (i.e., there is a link between nodes a and c in the network).

Condition 2: Node c is not a downstream node of node a in T.

Condition 3: Node c is not a downstream node of node b in T.

The first and second condition guarantee that a loop will not be created as a result of connecting node a to node c.

The third condition guarantees that the control traffic of node c towards the controller will not pass through node b which is assumed to have failed. Again, as soon as node a detects a failure in node b, it switches its outgoing link from (a, b) to (a, c).

If the above conditions are met, then link (a, c) could be assigned as the backup link for link (a, b), and this backup link could be generated in the controller and communicated to and pre-configured in node a. As soon as node a detects a failure in link (a, b), it will immediately change its route to the controller by changing the primary outgoing link (a, b) to the secondary outgoing link (a, c). Node a is also protected against the failure of its immediate upstream node, if node c satisfies the third condition above. Nodes having backup links contribute to the resilience of the network. Note that for those switches directly connected to the controller using in-band signaling, the upstream node protection is not defined as the immediate upstream node is the controller.

In the embodiment, it is assumed that there is no extended signaling mechanism for a node to inform its downstream nodes of a failure. Therefore, if a switch is disconnected from the controller and there is no backup path programmed in the switch, then all the downstream nodes of the disconnected switch will also be disconnected, even if the downstream nodes are themselves locally protected against failures of their outgoing links or immediate upstream nodes. Such a scenario contributes to less resilience of the network. Hence, in assigning a metric to evaluate network resiliency, more importance or weight should be assigned to nodes closer to the controller, the controller being the root of the controller routing tree.

Based on the above discussion, the weight of a node is based on the number of its downstream nodes, the weight of a routing tree being the sum of the weights of all the unprotected nodes. Because protected nodes, that is nodes with backup paths to the controller, are not counted when determining the weight of the routing tree, the routing tree weight is used to measure the "unprotectability" of the network. For a given routing tree T, this weight is referred to as $\Gamma(T)$. $\Gamma(T)$ should be minimized in order to maximize the resilience of the network. By adding out-of-band connections to certain nodes, an unprotected node can be made not a protected node, thus decreasing $\Gamma(T)$ and thus improving the resilience of the network.

The algorithm used in the embodiment determines the optimal placement of out-of-band connections between a subset of switches and the controller using a given number, m, of out-of-band connections. Corresponding to each m dedicated connection is a switch that is directly connected to the controller. These dedicated connections are used only for the control traffic and are assumed to be reliable for purpose of determining resiliency.

Parameter m, (as contrasted to the placement of each m dedicated connection) is an input to the algorithm used in the embodiment and is determined by the network management system or the operator. A larger m results in a more reliable network, as there are more direct connections between what were previously unprotected switches and the controller. The trade-off is that a larger m also means more cost for establishing these out-of-band connections.

With a given m, the embodiment determines the optimal placement of dedicated connections between switches and the controller that result in maximum resiliency gain. In other words, the algorithm seeks to make best use of these m out-of-band connections between the forwarding and control planes in terms of resiliency.

Assume that initially the controller routing tree is a shortest-path tree. If the size of the network is large, then a thorough search among all switches to find the optimal location for the m dedicated connections could become very complex. The algorithm used in the embodiment provides a heuristic greedy way of finding which m switches should be connected directly to the controller.

Figure 3:
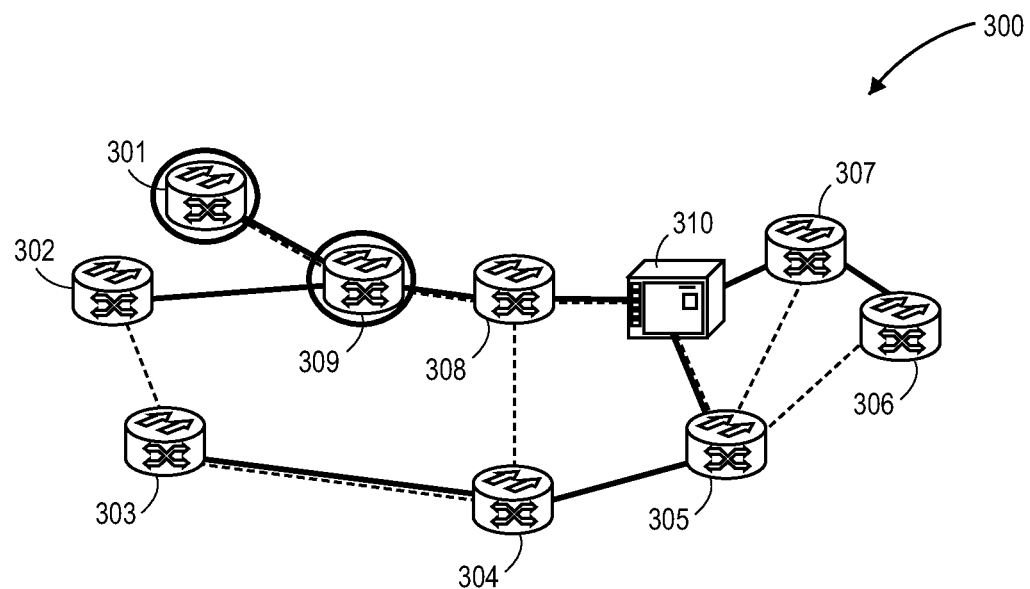
FIG. 3 is a graph illustrating a network topology with a routing tree based on in-band connections from the switches to the controller.

Referring to the topology 300 of FIG. 3, nine switches 301-309 are directly or indirectly connected to one controller 310 in the Internet2 topology 300 using purely in-band connections. Links in the network are shown in dashed lines and the routing tree is shown with the solid lines. In FIG. 3, the unprotected switches 301, 309 are circled. For example, 301 is unprotected, because if node 309 fails, there is no alternative path to reach the controller, given that the adjacent switch 302 will also be affected by the failure of switch 309. As seen in FIG. 3, an in-band model alone is not sufficient to achieve maximum resilience.

Figure 4:
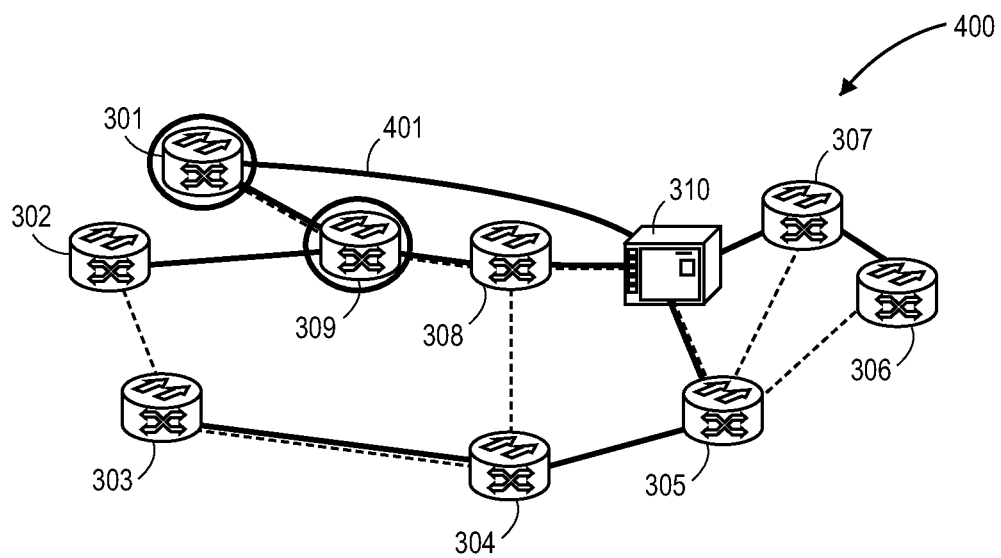
FIG. 4 is a graph illustrating a hybrid network topology with the routing tree of FIG. 3, further including an out-of-band connection to the controller.

However, as seen in the topology 400 of FIG. 4, adding one out-of-band link 401 from switch 301 to controller 310 improves the overall resilience of the network. Hence, the addition of the link between 301 and the controller 310 changes the routing tree in a manner in which all nodes 301-309 are protected from failure. In this example, by adding a single link 401, the resilience of the network can be improved significantly. The embodiment provides a systematic approach to compute where to locate the out-of-band links so as to optimize the resilience of the network.

The embodiment uses an approximation algorithm for determining the optimal placement of m dedicated connections between m switches to the controller using out-of-band links so as to provide maximum resilience for the network.

The embodiment selects unprotected nodes having the maximum number of downstream neighbors, and connects these otherwise unprotected nodes to the controller through out-of-band connections. As noted herein, in determining the most resilient routing tree, the algorithm first assigns each node a weight based on the number of all of its downstream nodes, also referred to as the node's children. It then determines which nodes do not have alternate paths to the controller, these nodes being unprotected nodes. Using only the nodes that are unprotected in the calculation, the embodiment then iteratively generates a set of proposed routing trees using the m dedicated connections from the unprotected nodes with the most children. Each such proposed routing tree uses the m out of band connections to convert otherwise unprotected nodes into protected nodes, thus reducing $\Gamma(T)$. In other words, the embodiment calculates a weight $\Gamma(T)$ for each proposed routing tree, $\Gamma(T)$ being the sum of the weights of all the unprotected nodes after the m dedicated connections are made. Because protected nodes, i.e., nodes with backup paths to the controller, are not counted when determining the weight of each such routing tree, the routing tree having the minimal weight $\Gamma(T)$ is selected as the routing tree for the network.

The unprotected nodes that are more likely to be chosen for one of the m dedicated connections are those that are closer to the controller which is the root of the tree as nodes that are closer to the controller contribute more to $\Gamma(T)$ compared to nodes that are further from the controller.

| Algorithm |
|---|
| 1. Initialize:<br>    S = set of all nodes (switches) in the network;<br>    n = number of nodes in S, (s(n)) being one of the n nodes in S;<br>    m = number of dedicated connections;<br>2.   for i = 1 to m do; Comment: m being the number of dedicated connections;<br>3.     Sort nodes in S such that $D(s(1)) \geq D(s(2)) \geq ... \geq D(s(n))$; Comment: $D((s(n)))$ = the number of neighbor nodes of (s(n)). Two nodes are neighbors if there is a link between them. This is the weight assigned to a node prior to determining its protected or unprotected status. Sort nodes (s(n)) from nodes with higher weights to nodes with lesser weight;<br>4.     selected-node(i) ← (s(1)); Comment: Starting with the first node having highest weight<br>5.         for j = 1 to n do; Comment: Steps 5-7 determine the degree to which a node is protected. The degree to which a node (s(j)) is protected is D'(s(j));<br>6.         A = neighbors of s(j) in S;<br>7.         D'(s(j)) = number of members of A that are directly connected to another member of A; Comment: The first node selected to be analyzed will automatically become D'(selected-node(i)). Thereafter, D'(s(j)) becomes D'(selected-node(i)) if it is more protected than the then current D'(selected-node(i)) per line 8;<br>8.             if D'(s(j)) > D'(selected-node(i)) then; Comment: Determine the most protected nodes and discard from the determination of where to place the m dedicated connections. In this way, the nodes with the most children and least protection are the first considered for the m dedicated connections;<br>9.             selected-node(i) ← s(j);<br>10.           end;<br>11         if (D'(s(j)) == D(s(j)) then break<br>12.     end<br>13.   S = S \ (selected-node(i))<br>14.   end |

It is seen that the objective of the embodiment is to assign the m dedicated connections that best improve the resilience of the controller routing tree. It does so, as seen in line 2, by performing m iterations to find m switches for out-of-band connections to the controller. As noted, m is a parameter determined by the user or operator.

The degree of a node s is the number of neighbor nodes in S and is denoted by D(s). Every iteration i starts by picking node (s(l)), the first node from an ordered list of network nodes, sorted in a decreasing degree order. At the end of the ith iteration, selected-node(i) is selected. This selected node(i) is the one with maximum number of protected neighbors. Here, D'(s) denotes the number of protected neighbors of nodes. Before starting the next iteration, the set of switches to search among is updated in line 14, and the selected node is removed from the search set S as nodes with the most protected neighbors are the least likely to be selected for the m dedicated connections.

In the jth iteration of the second loop seen in lines 5-12, the number of protected neighbors of node s(i) is first calculated as seen in line 7, and the selected-node is updated to node s(j) if it improves—in terms of the number of protected neighbors—the previously searched nodes (lines 6-9).

The algorithm stops when it finds m nodes providing the maximum number of protected neighbors, such nodes being chosen as the nodes to be provided with direct connections to the controller.

Figure 5:
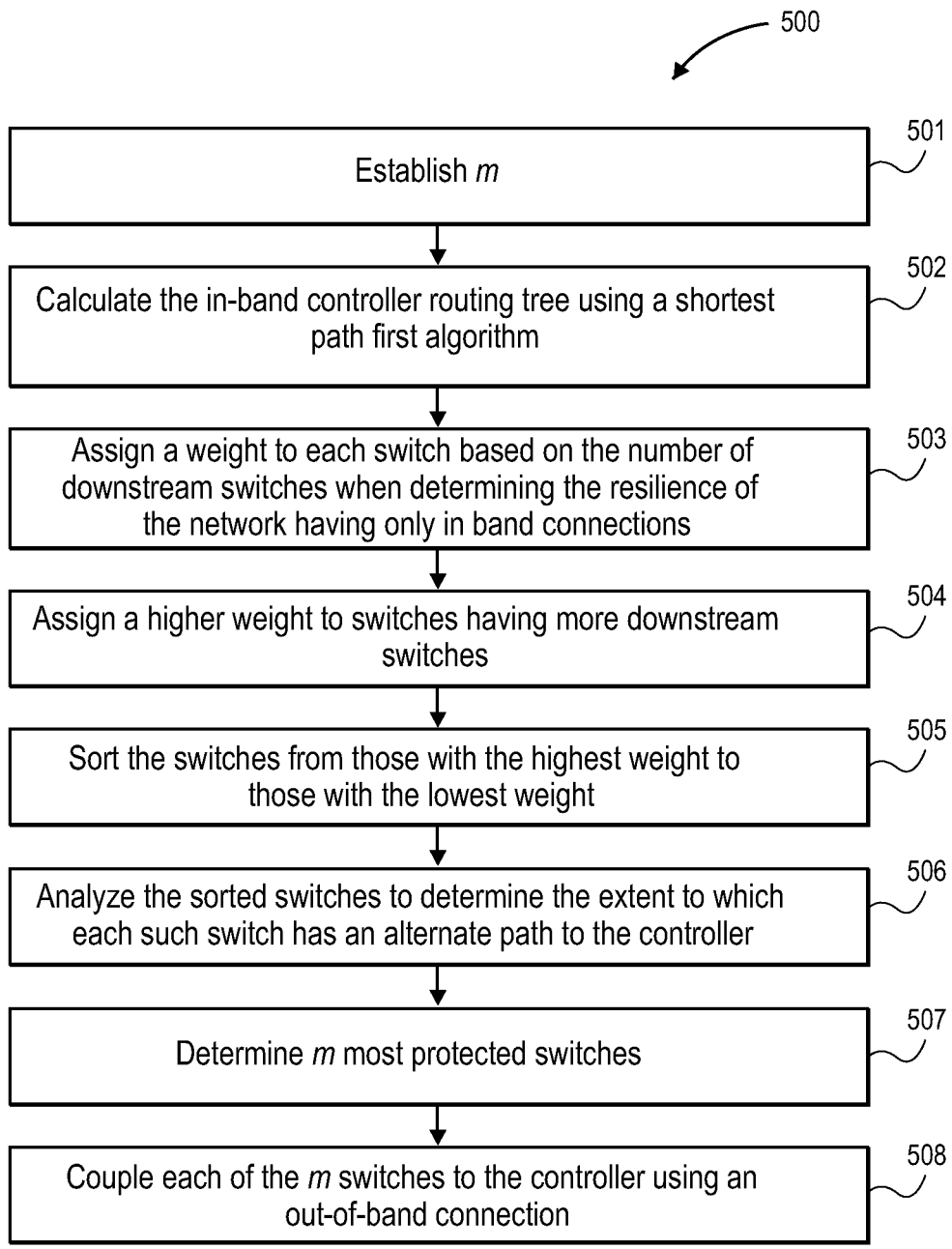
FIG. 5 is a flow chart of a routing algorithm used in the embodiment.

FIG. 5 is a flow chart 500 disclosing the steps of the algorithm of the embodiment. In step 501, m is established. In step 502, the in-band controller routing tree is calculated using a shortest path first algorithm. In step 503, a weight is assigned to each switch based on the number of downstream switches when determining the resilience of the network having only in band connections. In step 504, a higher weight is assigned to switches having more downstream switches. In step 505, the switches are sorted from those with the highest weight to those with the lowest weight. In step 506, the sorted switches are analyzed to determine the extent to which each such switch has an alternate path to the controller. In step 507, the m most protected switches are determined. In step 508, each of the m switches are coupled to the controller using an out-of-band connection.

Figure 6:
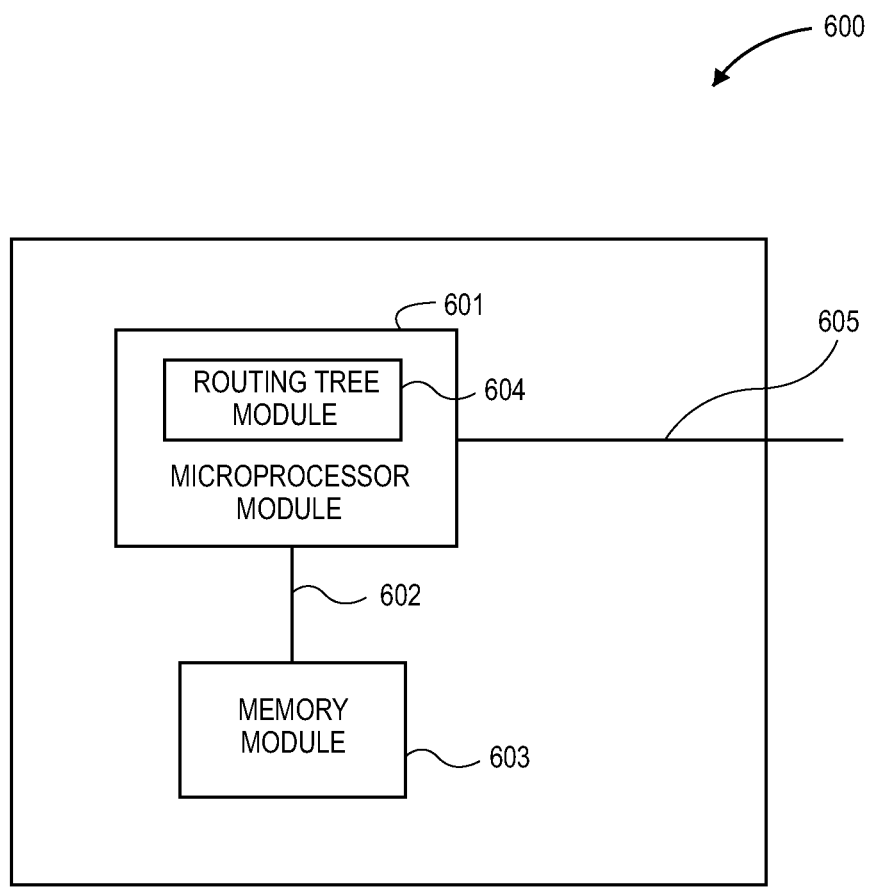
FIG. 6 is a block diagram of an apparatus configured to implement the routing algorithm used in the embodiment.

FIG. 6 is a block diagram 600 of an apparatus used to implement the method of FIG. 5. As seen therein, the algorithm of the embodiment is executed in routing tree module 604 of microprocessor module 601 with the results of the algorithm being stored within the non-transitory computer readable medium of memory module 603. The results of the algorithm are then made available via input/output 605. The microprocessor module 601 is coupled to a non-transitory computer readable memory module 603 over a bus 602. The routing tree module 604 is configured to calculate an initial controller routing tree using only in-band connections for control traffic between each switch and the controller, calculate the resilience of the network having only in-band connections, receive a parameter m, each m representing a dedicated connection between a corresponding switch and a controller for out-of-band control traffic and determine, using an approximation algorithm, the placement of each m dedicated connection between each corresponding switch and the controller so as to optimize the configuration of in-band and out-of-band connections for maximum resilience, in accordance with the method of the invention.

It is to be understood that the above description is intended to be illustrative and not restrictive. Many other embodiments will be apparent to those of skill in the art upon reading and understanding the above description. The scope of the embodiment should, therefore, be determined with reference to the appended claims, along with the full scope of equivalents to which such claims are entitled.

What is claimed is:

1. A method implemented by a network topology design system to determine a controller routing tree for use within a split architecture network where control plane components are executed by a controller and the data plane components are executed by a plurality of switches, the method comprising the steps of:

calculating an initial controller routing tree using in-band connections for control traffic between each switch and the controller;
calculating the resilience of the network having only in-band connections;
establishing a parameter m, each of m representing a dedicated connection between a corresponding switch and the controller for out-of-band control traffic; and
determining, using an approximation algorithm, the placement of each m dedicated connection between a switch and the controller so as to optimize the configuration of in-band and out-of-band connections for maximum resilience.

2. The method of claim 1, further comprising the step of calculating the in-band controller routing tree using a shortest path first algorithm.

3. The method of claim 2, further comprising assigning a weight to each switch based on the number of downstream switches when determining the resilience of the network having only in band connections.

4. The method of claim 3, further comprising the step of assigning a higher weight to switches having more downstream switches.

5. The method of claim 4, further comprising the step of sorting the switches from those with the highest weight to those with the lowest weight.

6. The method of claim 5, further comprising the step of analyzing the sorted switches to determine the extent to which each such switch has an alternate path to the controller.

7. The method of claim 6, further comprising determining m least protected switches by eliminating from the analysis the most protected switches.

8. The method of claim 6, further comprising the step of coupling each of the m switches to the controller using an out-of-band connection.

9. The method of claim 8, wherein the determining of parameter m is made by a network operator.

10. An apparatus of maximizing the resilience of a network, comprising:
a microprocessor module coupled to a non-transitory computer readable memory module over a bus, the microprocessor module further comprising a routing tree module configured to:
calculate an initial controller routing tree using only in-band connections for control traffic between each switch and the controller;
calculate the resilience of the network having only in-band connections;
receive a parameter m, each m representing a dedicated connection between a corresponding switch and a controller for out-of-band control traffic; and
determine, using an approximation algorithm, the placement of each m dedicated connection between each corresponding switch and the controller so as to optimize the configuration of in-band and out-of-band connections for maximum resilience.

11. The apparatus of claim 10, wherein the routing tree module is further configured to calculate the initial controller routing tree using a shortest path first algorithm.

12. The apparatus of claim 11, wherein the routing tree module is configured to assign a weight to each switch based on the number of downstream switches when determining the resilience of the network having only in band connections.

13. The apparatus of claim 12, wherein the routing tree module is configured to assign a higher weight to switches having more downstream switches.

14. The apparatus of claim 13, wherein the routing tree module is configured to sort the switches from those with the highest weight to those with the lowest weight.

15. The apparatus of claim 14, wherein the routing tree module is configured to analyze the sorted switches to determine the extent to which each such switch has an alternate path to the controller.

16. The apparatus of claim 15, wherein the routing tree module is configured to determine m least protected switches by eliminating from the analysis the most protected switches.

17. A network, comprising:
a controller,
a plurality of switches,
the plurality of switches coupled to the controller via in-band connections; and
m of the plurality of switches coupled to the controller via m out-of-band connections, wherein the placement of each m dedicated connection between each corresponding switch and the controller optimizes the configuration of in-band and out-of-band connections for maximum resilience and the determination of parameter m is made by a network operator.

* * * * *